United States Patent [19]

Nakamura

[11] Patent Number: 5,371,812
[45] Date of Patent: Dec. 6, 1994

[54] WAVEGUIDE TYPE OPTICAL DIRECTIONAL COUPLER

[75] Inventor: Masanori Nakamura, Gifu, Japan
[73] Assignee: Ibden Co., Ltd., Gifu, Japan
[21] Appl. No.: 117,122
[22] Filed: Nov. 22, 1993

[30] Foreign Application Priority Data

Jan. 21, 1992 [JP] Japan .................. 4-31433

[51] Int. Cl.$^5$ .................. G02F 1/313; G02B 6/26
[52] U.S. Cl. .................. 385/9; 359/332; 385/30; 385/40; 385/41; 385/42; 385/50
[58] Field of Search .................. 359/332; 372/6; 385/1-4, 8, 9, 14, 24, 28, 29, 30, 39, 40, 41, 42, 50

[56] References Cited

U.S. PATENT DOCUMENTS

| | | | |
|---|---|---|---|
| 4,073,675 | 2/1978 | Ballman et al. | 156/600 |
| 4,093,781 | 6/1978 | Heinz et al. | 428/697 |
| 4,645,293 | 2/1987 | Yoshida et al. | 385/40 |
| 4,696,536 | 9/1987 | Albares et al. | 385/14 |
| 4,953,931 | 9/1990 | Miyazaki et al. | 359/328 |
| 5,039,187 | 8/1991 | Ballman et al. | 385/130 |
| 5,061,030 | 10/1991 | Miyamoto et al. | 385/3 |
| 5,158,823 | 10/1992 | Enomoto et al. | 428/216 |
| 5,175,784 | 12/1992 | Enomoto et al. | 385/122 |
| 5,185,829 | 2/1993 | Yamada et al. | 385/37 |
| 5,209,917 | 5/1993 | Ohno et al. | 423/592 |
| 5,227,011 | 7/1993 | Enomoto et al. | 156/643 |
| 5,291,576 | 3/1994 | Nakamura | 385/142 |
| 5,315,432 | 5/1994 | Ohno | 359/326 |

FOREIGN PATENT DOCUMENTS

| | | |
|---|---|---|
| 0444209 | 9/1991 | European Pat. Off. ..... C30B 29/30 |
| 50-92300 | 7/1975 | Japan . |
| 52-125286 | 10/1977 | Japan . |
| 63-195198 | 8/1988 | Japan . |
| 1201628 | 8/1989 | Japan . |
| 2-12135 | 1/1990 | Japan . |
| 218395 | 1/1990 | Japan . |
| 9103000 | 3/1991 | WIPO . |
| 9104360 | 4/1991 | WIPO . |

OTHER PUBLICATIONS

Kaminow I. P., IEEE Transactions On Microwave Theory And Techniques, "Optical Waveguide Modulators", vol. 23, No. 1, Jan. 1975, New York, US, pp. 57–70.
Buritskii, K. S., Soviet Physics Technical Physics., "Electrooptical Modulator With Coupled Ti:LiNbO3 Channel Waveguides and Delta Beta Electrodes", vol. 28, No. 9, Sep. 1983, New York, US, pp. 1159–1160.
Fukunishi, S. et al., Applied Physics Letters, "Electro-optic Modulation of Optical Guided Wave in LiNbO3 Thin Film Fabricated EGM Method", vol. 24, No. 9, May 1974, New York, US, pp. 424–426.
"The Growth of LiNbO3 thin films by Liquid phase epitaxial", Journal of Crystal Growth, vol. 29, (1975) pp. 289–295. A. Ballman et al. (month not available).
"Epitaxial growth of ferroelectric films of roptoelectronic (SAW) applications", Journal of Crystal Growth, vol. 84, (1987), pp. 409–412. R. Neurgaonkar et al. (month not available).
"Direct measurement of temperature dependence of lattice mismatches between LPE-grown Li(Nb,Ta)O3 film and LiTao3 Substrate", Journal of Crystal Growth, vol. 46 (1979), pp. 607–614, (month not available).
Applied Physics Letters, vol. 28 No. 503, (1976) p. 6 line 20, month not available.

(List continued on next page.)

*Primary Examiner*—Frank Gonzalez
*Attorney, Agent, or Firm*—Sandler, Greenblum & Bernstein

[57] ABSTRACT

Down-sized optical directional coupler with high performance and reduction of power includes a LiTaO3 monocrystal substrate, at least two optical waveguides of a LiNbO3 monocrystalline thin film formed close to and parallel to each other, and means for changing a refractive index of the optical waveguide provided on at least one of the optical waveguides, thereby obtaining a matching of a lattice constant between the LiTaO3 monocrystal substrate and the LiNbO3 monocrystalline thin film.

10 Claims, 2 Drawing Sheets

OTHER PUBLICATIONS

"Light beam scanning and deflection in epitaxial LiNbO3 electro-optic waveguides"; Applied Physics Letters, vol. 25, No. 10, (15 Nov. 1974), pp. 563–565. Tien et al.

"Production of single crystal films of lithium niobate by liquid phase epitaxy", Chemical Abstract, CA97 (16):136726b, 1981. Voronov et al. (month not available).

English Language Abstract of Japanese Laid Open Patent Publication No. 1-201628, Aug. 14, 1989.

English Language Abstract of Japanese Laid Open Patent Publication No. 50-92300, Jul. 23, 1975.

English Language Abstract of Japanese Laid Open Patent Publication No. 52-125286, Oct. 20, 1977.

English Language Abstract of Japanese Laid Open Patent Publication No. 63-195198, Aug. 12, 1988.

English Language Abstract of Japanese Laid Open Patent Publication No. 2-12135, Jan. 17, 1990.

English Language Abstract of Japanese Laid Open Patent Publication No. 2-18395, Jan. 22, 1990.

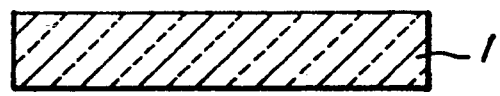
FIG._2a
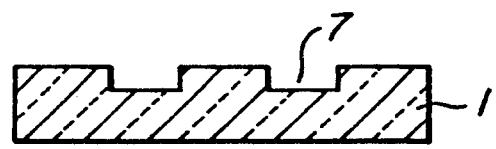
FIG._2b
FIG._2c
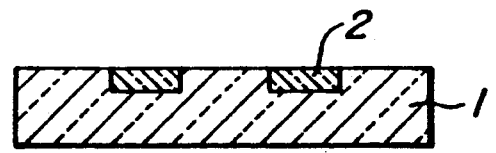
FIG._2d
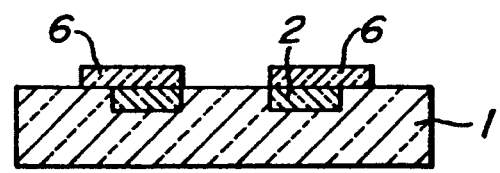
FIG._2e
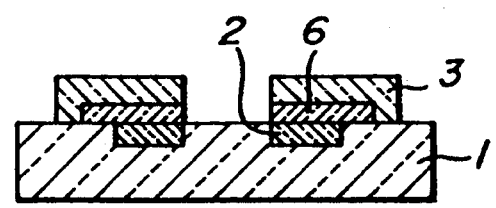
FIG._2f

WAVEGUIDE TYPE OPTICAL DIRECTIONAL COUPLER

TECHNICAL FIELD
BACKGROUND OF THE INVENTION

The present invention relates to an optical coupler, more particularly relates to a waveguide type optical coupler for use as an optical modulator and an optical switch in an optical integrated circuit used in an optical fiber communication system, an optical information processing system, an optical sensing system, an optical data registration system and the like.

In the field of the optical communication system, in order to build up optical fiber communication networks, it is necessary to develop the optical device, such as an optical matrix switch, or the like. The optical directional coupler is a component of such a matrix switch.

Such an optical directional coupler is an element used to control in electro-optical effect a phase difference which dominates a transfer of electric power in case of approaching two parallel waveguides.

BACKGROUND ART

As an optical directional coupler, hithertofore, a number of Ti diffused $LiNbO_3$ channel waveguides have been developed. $LiNbO_3$ is generally utilized as an optical device using the electro-optical effect, since it has a relatively larger electro-optical constant among stable inorganic optical crystals. Means for diffusing Ti into $LiNbO_3$ is well known as a method of forming a waveguide.

However, the Ti diffused $LiNbO_3$ waveguide has an electro-optical constant different from that of a bulk crystal (or $LiNbO_3$), since it has a different crystallizability from that of a virgin $LiNbO_3$, after the waveguide has been formed. Accordingly, when such an optical waveguide is used as the optical directional coupler, then a problem has arisen in an inability to realize the electric-power-saving and the down-sizing since a larger switching voltage and a longer effective length are required.

An object of the present invention is to provide a waveguide type optical directional coupler having an electro-optical constant larger than that of a bulk crystal.

SUMMARY OF THE INVENTION

Then, the present inventors have studied to realize the above object and have found that as a result of investigation, the cause of lowering electro-optic effect of the conventional Ti diffused $LiNbO_3$ lies in mismatching of a lattice constant between a substrate and a crystalline material forming the waveguide. The present invention is based on the fact that by matching the lattice constant of the respective crystalline materials between the substrate and the waveguide the optical directional coupling including an optical waveguide having superior electro-optic effect can be obtained.

According to the present invention, there is provided an optical directional coupling characterized by comprising a $LiTaO_3$ single crystal substrate, at least two optical waveguides consisting of a single crystal $LiNbO_3$ thin film formed close to and parallel to each other, and means for changing refractive index of the optical waveguide provided on at least one of the closed optical waveguides, thereby obtaining a matching of the lattice constant between the $LiTaO_3$ single crystal substrate and the $LiNbO_3$ monocrystalline thin film.

BEST MODE FOR CARRYING OUT THE INVENTION

Figure 1:
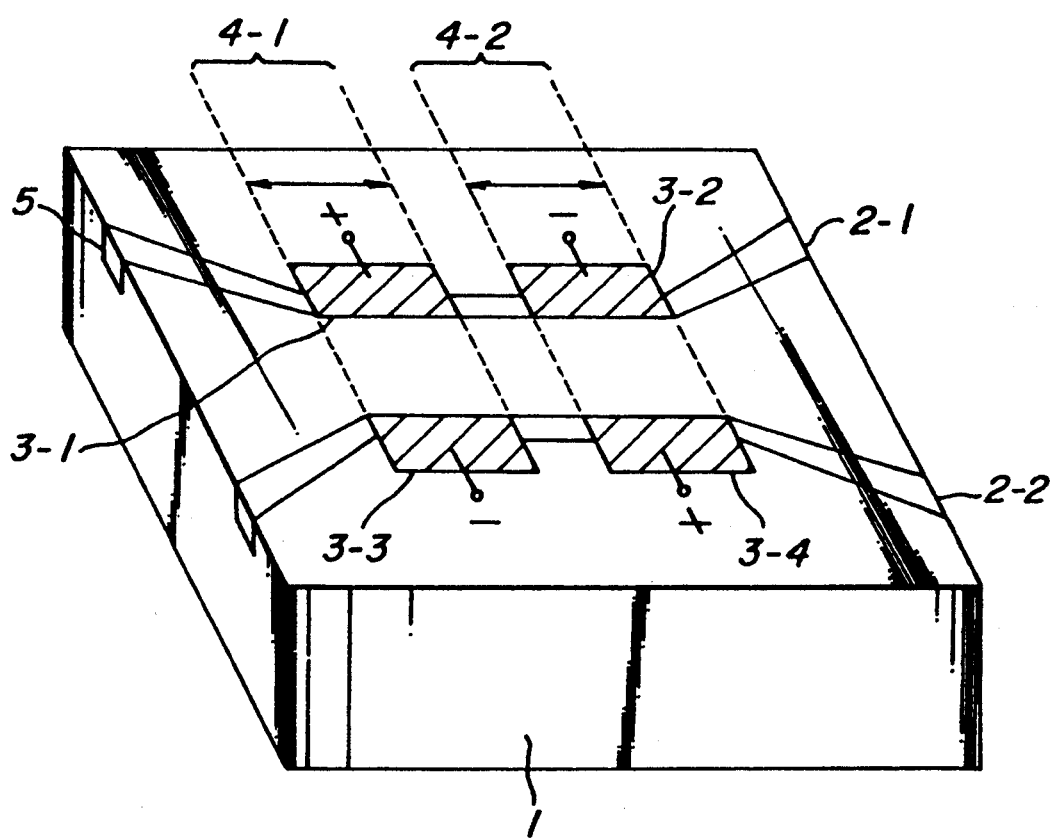
FIG. 1 is a perspective view showing an optical modulator comprising an optical directional coupler according to the present invention; and FIG. $2a \sim 2f$ are cross-sectional views showing processes of manufacturing an optical modulator comprising an optical directional coupler according to the present invention.

The present invention is an optical directional coupling characterized in that the $LiTaO_3$ single crystal substrate is provided, with at least two optical waveguides consisting of a thin film of the single crystal $LiNbO_3$ close to and parallel to each other, and means for changing refractive index of the optical waveguide is provided on at least one of the optical waveguides. Therefore, the lattice constant between the $LiTaO_3$ single crystal substrate and the $LiNbO_3$ monocrystalline thin film must be matched to each other.

The matching of a lattice length (or the lattice constant) means that the lattice constant of the $LiNbO_3$ monocrystal thin film is adjusted and placed within a range of 99.87 to 100.07%, preferably 99.92 to 100.03%, of the lattice constant of the $LiTaO_3$ monocrystal substrate.

With such a construction, it can prevent a strain (or crystal defect, lattice defect) caused by growing the $LiNbO_3$ monocrystal with a liquid phase epitaxial method, thereby obtaining a $LiNbO_3$ monocrystal waveguide having an electro-optic effect equivalent to that of a bulk $LiNbO_3$ monocrystal. Therefore, when the directional coupler is constructed with such an optical waveguide, a stable amplitude modulation can be realized with very high efficiency.

A method of effecting such a lattice matching may preferably be a method described in the International Patent Application Number PCT/JP/90/01207 proposed by the present inventors. There are (1) a method of containing Na and Mg into the $LiNbO_3$ monocrystal; (2) a method of varying a ratio of Li and Nb in a range of 41/59 to 56/44; (3) a method of reducing the lattice constant of the $LiTaO_3$ monocrystalline substrate by Ti doping or the like.

In this case, the first method (1) is the most preferable, since the lattice constant of the $LiTaO_3$ monocrystalline substrate is larger than that of the $LiNbO_3$ monocrystal, so that the lattice constant of the $LiNbO_3$ monocrystal can be increased by containing Na and Mg thereinto.

When Na and Mg are contained in the $LiNbO_3$ monocrystal, the contents thereof may preferably be Na of 0.1 to 14.3 mol %, and Mg of 0.8 to 10.8 mol %.

The operating principle of the optical directional coupler according to the present invention is explained with reference to FIG. 1.

Two optical waveguides 2-1, 2-2 of the $LiNbO_3$ monocrystal thin film are formed close to and parallel to each other on a (0001) face of the surface of the $LiTaO_3$ monocrystalline substrate 1. In this case, (0001) face of the optical waveguide of the $LiNbO_3$ monocrystal thin film must be laminated on the (0001) face of the $LiTaO_3$ monocrystalline substrate 1. In this case, the lattice constant of respective "a" axes must be matched.

The optical directional coupler according to the present invention constitutes a $\Delta\beta$ inversion type directional coupler by providing electrodes 3-1, 3-2, 3-3, 3-4 of a suitable construction on the optical waveguides 2-1, 2-2 of the LiNbO$_3$ monocrystal thin film, so that it is desirable to induce refractive index change by an electro-optic effect of the optical waveguides 2-1, 2-2 of LiNbO$_3$ monocrystal thin film, to control the coupling state of the guided wave electrically, and to effect the modulation of the power intensity and exchange of the optical paths.

It is advantageous to use a planar electrode. In order to decrease an effect of a DC drift or the like, it is advantageous to provide a buffer layer such as SiO$_2$ or the like between the optical waveguide and electrodes.

In this construction, it is assumed that the coupling portion necessary to transfer an optical power of 100% from one optical waveguide to the other optical waveguide is a coupling length L$_0$ of 0 dB. The coupling length L$_0$ is determined by the refractive index and a gap width of the optical waveguide, the wavelength of the laser light or the like. Moreover, when it is assumed that phase differences between two optical waveguides caused by the applied voltage (since electrostatic focusing is caused under the electrode and its signs are different, phase differences caused by changing in such a manner that the propagation constant of the optical waveguide is increased on the one hand and decreased on the other hand) is $\Delta\beta$, and the length of close and parallel regions is made L, when a light 5 of unit intensity is incident on the optical waveguide 2-1, the light power intensities of both optical waveguides 2-1,2-2 are shown by following formulas as designated in Applied Physics Letters, Vol. 28, No. 503 (1976) by R. V. Schmidt et. al.

$$P_1 = \{1 - 2(\chi/\beta c)^2 \sin^2[(\tfrac{1}{2})\beta cL]\}^2$$

wherein P$_1$ is light intensity $\chi$ is coupling factor $\beta c$ is the value shown later $\Delta\beta$ is a difference of the propagation constant of two waveguides caused in case of applying voltage L is the complete coupling length $(=\pi/2\chi)$ $$P_2 = (2\chi/\beta c)^2 \sin^2[(\tfrac{1}{2})\beta cL]\{\cos^2[(\tfrac{1}{2})\beta cL + (\Delta\beta/2\beta c)^2 \sin^2[(\tfrac{1}{2})\beta cL]\}$$

$\beta c = [\chi^2 + (\Delta\beta/2)^2]^{\tfrac{1}{2}}$ $\chi = \pi/2L_0$ wherein P$_2$ is the light intensity.

As shown in the above formulas, if the phase difference $\Delta\beta$ is given by changing the voltage applied to the electrodes, it is found that the light intensity can be modulated.

As explained above, the optical directional coupler according to the present invention may serve as an optical modulator and an optical switch.

A method of producing the optical directional coupling according to the present invention will now be described as follows.

As a method of producing the optical waveguide of the LiNbO$_3$ monocrystalline thin film, there are two methods as follows.

(1) The waveguide is formed in the substrate: A method of forming an optical waveguide 2 in which a recess is formed in a waveguide formed portion of a LiTaO$_3$ monocrystalline substrate 1, a LiNbO$_3$ monocrystal thin film is grown while effecting lattice matching thereof, thereafter a surplus portion is removed and the LiNbO$_3$ monocrystal thin film is remained only in the recess, thereby forming the optical waveguide 2.

(2) The waveguide is formed on the surface of the substrate: A method of forming an optical waveguide 2 in which the LiNbO$_3$ monocrystalline thin film is grown on the LiTaO$_3$ monocrystalline substrate 1, while effecting lattice matching, thereafter removing a surplus portion by masking using Ti or the like and by dry-etching on the waveguide formed portion, thus forming the waveguide 2.

The method of forming the LiNbO$_3$ monocrystalline thin film, while effecting the lattice matching is achieved by contacting the LiTaO$_3$ monocrystalline substrate 1 with a melt consisted of lithium oxide-vanadium pentoxide-niobium pentoxide-sodium oxide-magnesium oxide.

Electrode 3 is provided on the optical waveguide 2 of the thus formed LiNbO$_3$ monocrystalline thin film in order to change the refractive index. It is desirable to form the electrode 3 by coating a metal film such as aluminum or the like onto the optical waveguide 2 by vapor-deposition or sputtering techniques.

A buffer layer 6 such as SiO$_2$ or the like may also be provided between the optical waveguide 2 and the optical waveguide 3.

EXAMPLE 1

(1) Two mol % of MgO with respect to a theoretical quantity of LiNbO$_3$ which could be separated out from a melt composition was added to a mixture consisting of Na$_2$CO$_3$ 22 mol %, Li$_2$CO$_3$ 28 mol %, V$_2$O$_5$ 40 mol % and Nb$_2$O$_5$ 10 mol %, a resultant mixture material was put into a platinum crucible, the mixture within which was heated up to 1100° C. and melted under an air atmosphere within an epitaxial growth furnace. The resultant obtained melt in the crucible was stirred over 12 hours at a rotating speed of 100 rpm with a platinum propeller.

(2) A (0001) surface of a LiTaO$_3$ monocrystal substrate 1 (a lattice constant 5.1538 Å of "a" axis) with a thickness of 2 mm was polished optically, and thereafter a chemical etching was performed. Then, a portion where the waveguide 2 was formed as shown in FIG. 1 was patterned by a photolithography technique and then two grooves 7 (FIG. 2b) with a width of 5 μm, a depth of 1.2 μm and a space of 6 μm has been formed by a dry-etching technique. Then, the melt is gradually cooled down to 915° C. at a cooling rate of 60° C. per hour, and thereafter the substrate 7 was preliminarily heated at 915° C. over 30 minutes, and dipped into the melt while rotating it at 100 rpm during 8 minutes. In this case, a growth rate of LiNbO$_3$ was 1 μm per minute.

(3) The substrate 1 was taken up from the melt, and a surplus melt was shaken away by rotating at 1000 rpm during 30 seconds, and then gradually cooled to a room temperature at a cooling rate of 1° C. per minute, thereby obtaining an LiNbO$_3$ monocrystalline thin film 8 (FIG. 2c) with Na and Mg contents of about 8 μm thickness on the substrate material.

(4) The Na and Mg contents contained in the thus obtained LiNbO$_3$ monocrystalline thin film 8 were 3 mol % and 2 mol % respectively. A lattice constant "a" axis of the thin film 8 was 5,156 Å, and a refractive index measured by an guided light with a wavelength of the coupled light of 1.15 μm was 2.235±0.001.

(5) Further, a surplus portion was removed by etching the LiNbO₃ monocrystalline thin film 8 with ion beam, thereby forming optical waveguides 2 (FIG. 2d) of the LiNbO₃ monocrystalline thin film.

(6) SiO₂ buffer layers 6 (FIG. 2e) were formed on the optical waveguides 2 by a sputtering technique and aluminum electrodes 3 (FIG. 2f) were formed on the waveguides by the vapor deposition method and by patterning technique so as to obtain an effective length of 15 mm.

(7) The optical waveguide device thus produced was coupled to a laser beam of a wavelength of 1.3 μm at TM mode and an AC voltage of 4 GHz was applied thereto, and thereafter the properties or the device was estimated. In this case, extinction ratio of 17 dB was obtained at an operating voltage of 3 V. It has been found as a result of measurement with aging of an emitting light that the modulating voltage and the optical power were not changed at least during the time of 24 hours. These measurements were performed according to JIS-C5931.

EXAMPLE 2

(1) The optical waveguide 2 was formed by the same method as the case of Example 1, but the effective length of the aluminum electrode 3 was 10 mm.

(2) The optical waveguide device thus produced was coupled to a laser beam of a wavelength of 1.3 μm at TM mode and an AC voltage was applied thereto, and thereafter the properties of the device was estimated. In this case, extinction ratio of 20 dB was obtained at an operating voltage of 8.4 V. It has been found as a result of measurement with aging of an emitting light that the switching voltage and the optical power were not changed at least during the time of 24 hours. These measurements were performed according to JIS-C5931.

EXAMPLE 3

(1) Two mol % of MgO with respect to a theoretical quantity of LiNbO₃ which could be separated out from a melt composition was added to a mixture consisting of Na₂CO₃ 22 mol %, Li₂CO₃ 2 mol %, V₂O₅ 40 mol % and Nb₂O₅ 10 mol %, a resultant mixture material was put into a platinum crucible, the mixture within which was heated up to 1100° C. and melted under an air atmosphere within an epitaxial growth furnace. The resultant obtained melt in the crucible was stirred over 12 hours at a rotating speed of 100 rpm with a propeller.

(2) A (0001) surface of a LiTaO₃ monocrystal substrate 1 (a lattice constant 5.1538 Å of "a" axis) with a thickness of 2 mm was polished optically. Then, the melt is gradually cooled down to 915° C. at a cooling rate of 60° C. per hour, and thereafter the substrate 1 was preliminarily heated at 915° C. over 30 minutes, and dipped into the melt while rotating it at 100 rpm during 8 minutes. In this case, a growth rate of LiNbO₃ was 1 μm per minute.

(3) The substrate 1 was taken up from the melt, and a surplus melt was shaken away by rotating at 1000 rpm during 30 seconds, and then gradually cooled to a room temperature at a cooling rate of 1° C. per minute, thereby obtaining an LiNbO₃ monocrystalline thin film 8 with Na and Mg contents of about 8 μm thickness on the substrate material.

(4) The Na and Mg contents contained in the thus obtained LiNbO₃ monocrystalline thin film 8 were 3 mol % and 2 mol % respectively. A lattice length ("a" axis) of the thin film 8 was 5.156 Å, and a refractive index measured by an guided light with a wavelength of a coupled light of 1.15 μm was 2.235±0.001.

(5) A portion of the optical directional coupling was patterned and Ti mask was formed, and a ridge type channel waveguide was produced by Ar plasma etching.

(6) SiO₂ buffer layers 6 were formed on the optical waveguides 2 by a sputtering technique and aluminum electrodes 3 were formed on the waveguides by the vapor depositing and by patterning so as to obtain an effective length of 15 mm.

(7) The optical waveguide device thus produced was coupled to a laser beam of a wavelength of 1.3 μm at TM mode and an AC voltage of 4 GHz was applied thereto, and thereafter the properties of the device was estimated. In this case, extinction ratio of more than 17 dB was obtained at an operating voltage of 2.55 V. It has been found as a result of measurement with aging of an emitting light that the modulating voltage and the optical power were not changed at least during the time of 24 hours.

EXAMPLE 4

(1) The optical waveguide 2 was formed by the same method as the case of Example 1, but the effective length of the aluminum electrode 3 was 25 mm.

(2) The optical waveguide device thus produced was coupled to a laser beam of a wavelength of 1.3 μm at TM mode and an AC voltage was applied thereto, and thereafter the properties of the device was estimated. In this case, extinction ratio of more than 20 dB was obtained at an operating voltage of 3.3 V. It has been found as a result of measurement with aging of an emitting light that the switching voltage and the optical power were not changed at least during the time of 24 hours.

Comparative Example 1

(1) Ti was formed by a vapor deposition technique with a thickness of approximately 100 Å on a Z surface of a LiNbO₃ monocrystalline substrate having a C axis as a thickness direction and having a size of substantially 5×15 mm with a thickness of 0.5 mm and at the same position as the place on which the optical waveguide was formed in the Example 1. Thereafter, Ti was patterned and thermally treated at 1000° C. during few hours, thereby thermal-diffusing Ti into the LiNbO₃ monocrystalline substrate resulting a formation of an optical waveguide.

(2) Buffer layer of SiO₂ was formed on the optical waveguide by a sputtering technique and aluminum electrodes were formed on the waveguide by the vapor deposition technique and by patterning technique so as to obtain an effective length of 15 mm.

(3) The optical waveguide device thus produced was coupled to a laser beam of a wavelength of 1.3 μm at TM mode and an AC voltage of 4 GHz was applied thereto, and thereafter the properties of the device was estimated. In this case, extinction ratio of more than 17 dB was obtained at an operating voltage of 3.5 V. It has been found as a result of measurement with aging of an emitting light under the applied AC voltage that the modulating voltage was changed within 10 minutes and thus the optical power become unstable.

Comparative Example 2

(1) A (001) surface of an LiTaO$_3$ monocrystal having a thickness of 2 mm was polished.

(2) Then, a mixture material consisting of Li$_2$CO$_3$ 50 mol %, V$_2$O$_3$ 40 mol %, and Nb$_2$O$_5$ 10 mol % was heated to 1000° C. thereby forming a melt. Thereafter, this melt was gradually cooled to 915° C. at a cooling rate of 60° C. per hour, concurrently the substrate was preliminary heated at 915° C. during 30 minutes, then dipped into the melt during 8 minutes while rotating at 100 rpm. A growth rate of LiNbO$_3$ was 1 μm per minute.

(3) The substrate 1 was taken up from the melt, and a surplus melt was shaken away on the melt while rotating at 1000 rpm during 30 seconds, and then gradually cooled to the room temperature at a cooling rate of 1° C. per minute, resulting in an LiNbO$_3$ monocrystalline thin film of about 8 μm thickness formed on the substrate material.

(4) A surplus portion of the LiNbO$_3$ monocrystalline thin film was removed by an ion beam etching, thereby forming a ridge type LiNbO$_3$ monocrystalline waveguide.

(5) An alumina buffer layer was formed on the optical waveguide 2 by sputtering, and aluminum electrodes were formed on the waveguide by the photolithography and vapor deposition techniques.

(6) The optical waveguide device thus produced was coupled to a laser beam of a wavelength of 1.3 μm at TM mode and a DC voltage was applied thereto, and thereafter the properties of the device was estimated. In this case, extinction ratio of more than 20 dB was obtained at an operating voltage of 10 V. However, it has been found as a result of measurement with aging of an emitting light under the applied AC voltage that the modulating voltage was changed within 10 minutes and thus the optical power become unstable. The measuring method was performed according to JIS-C5931.

Table 1 shows measured results of the respective propers of the examples 1, 2, 3 and 4 as well as the comparative examples 1 and 2.

TABLE 1

| | Example (1) | Example (2) | Example (3) | Example (4) | Example (5) | Example (6) |
|---|---|---|---|---|---|---|
| Width of Waveguide (μm) | 5 | 5 | 5 | 5 | 5 | 5 |
| Effective length of electrode | 15 | 10 | 20 | 25 | 15 | 10 |
| Driving voltage (mm) | 3 | 8.4 | 2.5 | 3.3 | 3.5 | 10 |
| Electrode interval (mm) | 6 | 6 | 6 | 6 | 6 | 6 |
| Extinction ratio (dB) | 17 | 20 | 17 | 20 | 17 | 20 |
| Modulating frequency (GHz) | 4 | DC | 4 | DC | 4 | DC |
| Aging Change (Output fluctuation) | Non | Non | Non | Non | Presence | Presence |

As is found from numerical value shown in Table 1, the optical directional coupler according to the present invention can exhibit superior characteristics than the conventional optical waveguide.

Moreover, in the optical directional coupler according to the present invention, since the lattice length is matched between the optical waveguide of the LiNbO$_3$ monocrystalline thin film and the LiTaO$_3$ monocrystal substrate, then lattice distortion is not formed in the optical waveguide of the LiNbO$_3$ monocrystalline thin film, and even if the refractive index change due to the electric field is repeated, the refractive index of the optical waveguide of the LiNbO$_3$ monocrystalline thin film is not largely changed from its initial value, so that a lifetime of the optical directional coupler can be lengthened as compared with the conventional optical directional coupler.

INDUSTRIAL APPLICABILITY

As describer above, the optical directional coupler according to the present invent ion has superior characteristics than the conventional optical directional coupler and is an optical switch and an optical modulator with a long lifetime, so that it can be preferably used in a field of an optical communication system, an optical information system and an optical sensing system.

What is claimed is:

1. An optical directional coupling comprising:
   a LiTaO$_3$ monocrystal substrate;
   a plurality of optical waveguides of a LiNbO$_3$ monocrystalline thin film formed close to and parallel to each other, with lattice constants of the LiTaO$_3$ monocrystal substrate and the LiNbO$_3$ monocrystalline thin film being matched to each other; and
   refractive index changing means provided on at least one of said optical waveguides for changing a refractive index of the at least one optical waveguide.

2. The optical directional coupling as claimed in claim 1, wherein said substrate has a surface, and the plurality of optical waveguides are formed on the surface of the substrate.

3. The optical directional coupling as claimed in claim 1, wherein said substrate has a surface, and the plurality of optical waveguides are formed in a groove on the surface of the substrate.

4. The optical directional coupling as claimed in claim 1, wherein the lattice constant of the LiNbO$_3$ monocrystalline thin film is within a range of 99.81~100.07% of the lattice constant of the LiTaO$_3$ monocrystal substrate.

5. The optical directional coupling as claimed in claim 1, wherein the lattice constant of the LiNbO$_3$ monocrystalline thin film is within a range of 99.92~100.073% of the lattice constant of the LiTaO$_3$ monocrystal substrate.

6. The optical directional coupling as claimed in claim 1, wherein the lattice matching is with respect to "a" axis of (0001) face of a surface of the LiTaO$_3$ monocrystal substrate and "a" axis of (0001) face of a surface of the LiNbO$_3$ monocrystalline thin film.

7. The optical directional coupling as claimed in claim 1, wherein the means for changing the refractive index of the optical waveguide comprises at least one electrode.

8. The optical directional coupling as claimed in claim 7, further comprising an SiO$_2$ buffer layer between at least one of the plurality of optical waveguides and the at least one electrode.

9. The optical directional coupling as claimed in claim 7, wherein said at least one electrode comprises an electrode associated with each of said plurality of optical waveguides.

10. The optical directional coupling as claimed in claim 9, further comprising an SiO$_2$ buffer layer between each of the plurality of optical waveguides and the associated electrode.

* * * * *